Oct. 27, 1925.  1,559,469
H. R. STAMBAUGH
AUTOMATIC GAS CUT-OFF
Filed March 19, 1925    2 Sheets-Sheet 2
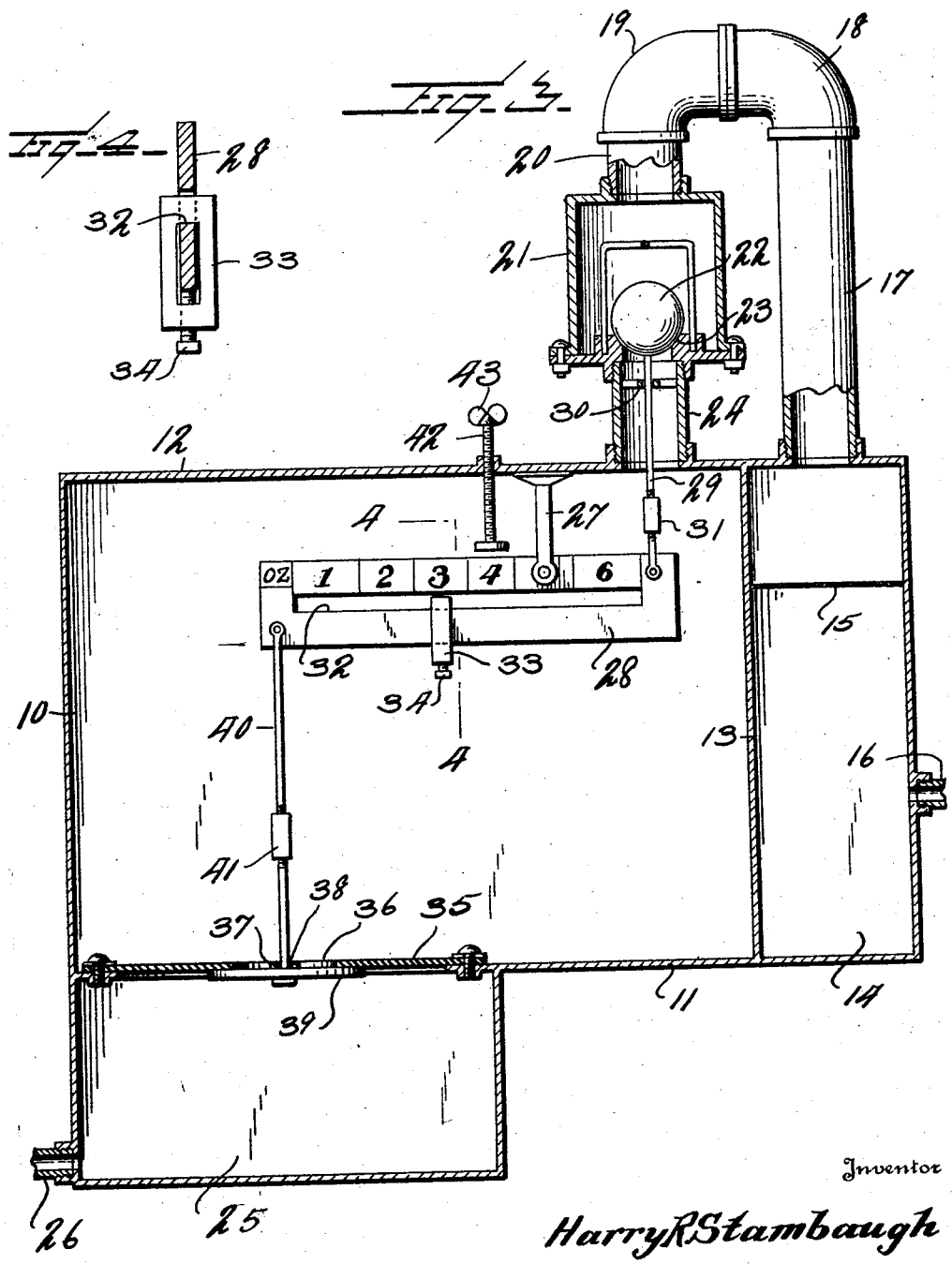
Inventor
Harry R Stambaugh
By Watson E Coleman
Attorney Patented Oct. 27, 1925.

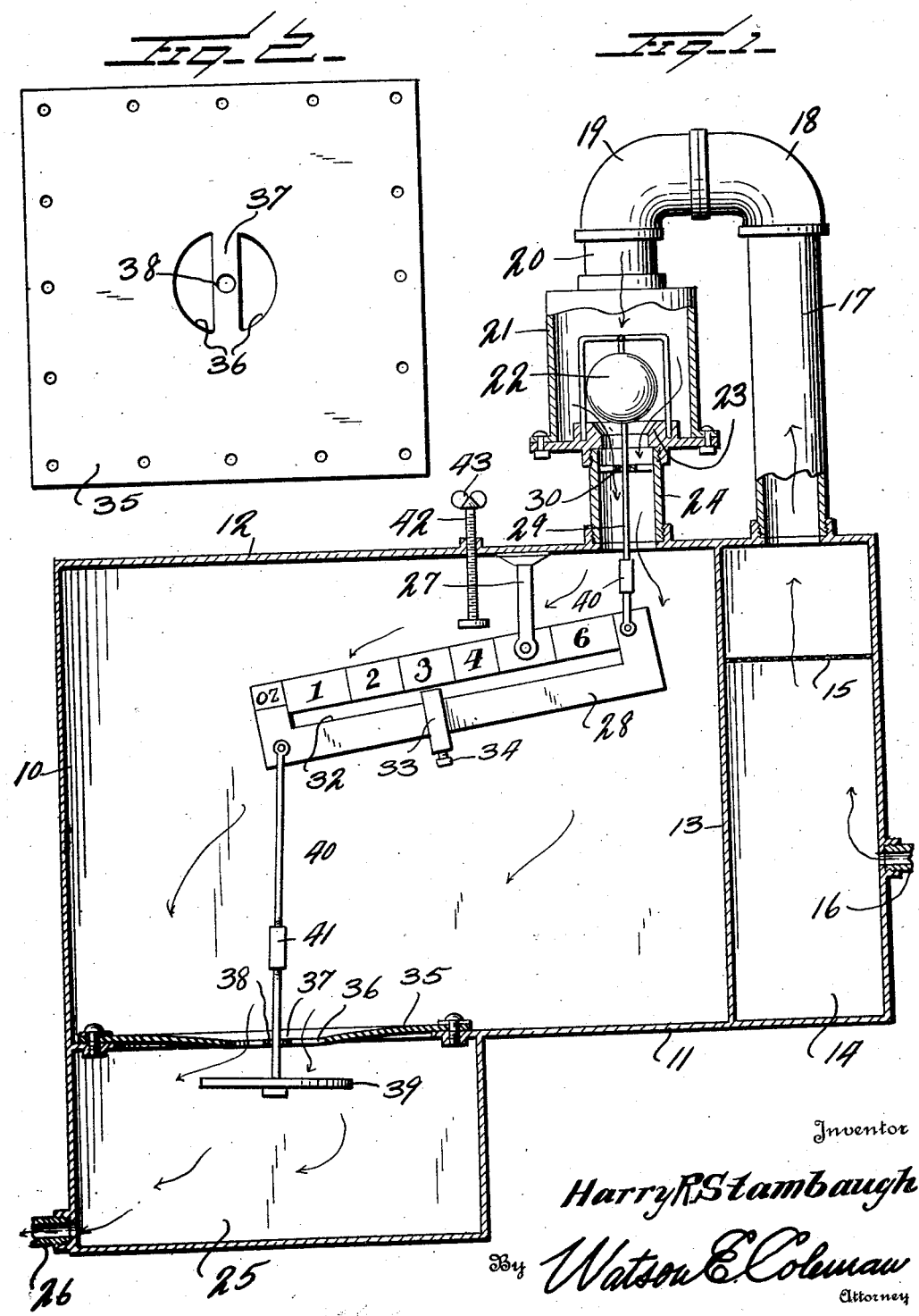

1,559,469

UNITED STATES PATENT OFFICE.

HARRY R. STAMBAUGH, OF FOSTORIA, OHIO.

AUTOMATIC GAS CUT-OFF.

Application filed March 19, 1925. Serial No. 16,852.

*To all whom it may concern:*

Be it known that I, HARRY R. STAMBAUGH, a citizen of the United States, residing at Fostoria, in the county of Seneca and State of Ohio, have invented certain new and useful Improvements in Automatic Gas Cut-Offs, of which the following is a specification, reference being had to the accompanying drawings.

This invention relates to devices for stopping the flow of gas in pipe lines when the flow is reduced beyond a minimum point or ceases.

The general object of the invention is to provide a mechanism of this character which is simple, which is positively acting, and which is adjustable so that it will close when the gas flow reaches a certain predetermined low point.

A further object is to provide a device of this character which includes a valve, a balancing arm for lifting the valve and which is connected to a second valve, a diaphragm, there being a weight mounted upon the balancing arm for adjustment so that the balancing arm may be adjusted to keep the valve open even with relatively slight flow of gas but cause the valve to close when the flow has reached this certain predetermined low point.

A still further object in this connection is to provide means whereby the valve may be temporarily opened so as to start the flow of gas after a drop in pressure has caused the closing of the valve, and to provide means whereby all gas passing into the apparatus shall be screened to prevent small particles of dust and foreign matter from entering the apparatus and stopping the operation of the mechanism.

Other objects will appear in the course of the following description.

My invention is illustrated in the accompanying drawings, wherein:—

Figure 1 is a fragmentary sectional view of an automatic gas cut off constructed in accordance with my invention;

Figure 2 is a top plan view of the diaphragm;

Figure 3 is a like view to Figure 1 but showing the valve 22 in its closed position cutting off the supply of gas;

Figure 4 is a section on the line 4—4 of Figure 3.

Referring to these drawings, 10 designates a casing which is illustrated as rectangular in form and which has a bottom wall 11 and a top wall 12. One end wall is designated 13, and disposed against this end wall is the duct 14 intersected by the screen 15. Entering this duct 14 is the supply pipe 16, and passing from the upper end of the duct 14 is a pipe 17 connected by elbow sections 18 and 19 to a downwardly extending pipe section 20 which opens into a valve casing 21 wherein is disposed a ball valve 22 adapted to coact with a seat 23. This valve chamber 21 communicates through the seat 23 with a pipe section 24 which opens into the top of the chamber 10.

It will thus be seen that the gas entering the pipe 16 will pass up through the chamber 14 and the screen 15 and through the pipe sections 17, 18, 19 and 20, the valve chamber 21 and the pipe section 24 into the chamber 10. The bottom wall 11 of this chamber is provided with an opening opening into a chamber 25 from which an outlet pipe 26 extends, and the gas in its normal passage and when the valve is open and the pressure is sufficient passes from the chamber 10 into this chamber 25 and thence out through the pipe 26 to the house system.

Attached to the top of the chamber 10 are the supporting brackets 27, and pivotally mounted upon these supporting brackets is the balance arm 28. It will be seen that this balance arm is pivoted approximately one-third from one end. The short end of this balance arm is engaged with the valve 22 by means of a pin 29 which extends upward through a guide 30 formed in the pipe section 24, this pin being formed in two sections connected by a turnbuckle 31 or other adjusting means, and the lower section of the pin being pivotally connected to the balance arm. The balance arm is provided with a longitudinally extending slot 32, and operating along the balance arm and engaging this slot is an adjustable counterweight 33 having a set screw 34 whereby it may be fastened in any desired position. The balance arm is provided with a plurality of graduations designed to be ounce graduations and marked, as illustrated, 1, 2, 3, 4, etc. The weight may be shifted along this balance arm, therefore, from one end to the other thereof, and obviously when the weight is at that end of the arm marked 1, it will exert its greatest force to cause the pin 29 to lift the valve 22, whereas when the weight is beneath the bracket 27 it will exert almost no force, and when it is at the end of the short arm it will exert a downward pulling force.

Extending over the opening in the floor 11 of the chamber 10 is a diaphragm 35 of rubber, leather or any other suitable material, this diaphragm having apertures 36, the apertures being in the form of segments of a circle separated by a transversely extending cross piece 37 which is apertured and provided with an eyelet 38. Immediately below these apertures 36 there is disposed a gas controlling valve 39 and this valve is connected by means of a sectional rod 40 to the end of the long arm of the lever 28. This sectional rod 40 is provided in its length with a turnbuckle 41 whereby the length of the arm may be adjusted.

For the purpose of depressing the long end of the arm when it is desired to open the valve 22 (which is necessary after the valve has automatically closed), I provide a depressible plunger 42 which, as illustrated, is screw-threaded and is disposed immediately above the upper edge of the arm 28 and is provided with a wing nut or handle 43. When this plunger is depressed, it will force downward on the balance arm 28 and thus the short end of the arm will rise, causing the pin 29 to lift the valve 22 from its seat. If then the plunger 42 be lifted, the parts will function properly until there comes such a reduction in pressure within the gas line as will cause the device to operate to cut off this pressure.

The operation of this mechanism is as follows: Normally, and assuming that the ball 22 has been lifted from its seat by the pin 29 and that the lever is depressed so that the valve 39 is open, then gas will pass from the pipe 14, through the pipes 17, 18, 19 and 24, and past the valve 22 into the chamber 10, it will fill this chamber and pass through the apertures 36 into the chamber 25 (which really forms a part of the chamber 10), and thus out through the pipe 26. So long as the flow of gas remains constant or is not reduced beyond a certain minimum point, the valve 39 will remain open, as will the valve 22, and gas will pass to the pipe line, as usual. If, however, the flow should be reduced beyond the minimum point established by the action of the weight 33, as, for instance, if the gas outlet valve (not shown) is closed or the flow of gas from the main should be reduced, as will be hereafter explained, then the valve 39 and the diaphragm 35 will rise and the pin 29 will descend, causing the closing of the valve 22, cutting off the passage of gas to the chamber 10. The gas will remain cut off until the plunger 42 is again depressed to lift the valve 22 and depressing the valve 39, permitting the flow of gas again. The plunger is then raised and the gas will continue to flow until the pressure is again reduced or the outlet valve is turned to cut off the gas. By adjusting the weight 33, the minimum flow of gas at which the valve 22 will close is controlled. Thus, for instance, if the weight is adjusted under the numeral 3, then the valve will close when pressure on the valve 39 has been reduced to three ounces, and if it is set on 2 it will close when pressure on the valve 32 caused by the flow of gas around the valve has been reduced to two ounces. When balance weight is set at the inner end of the balance arm, it takes only very little flow of gas to keep the valve open, and obviously when the balance weight is set adjacent its pivot 27 or set at the short end of the arm, it will require the gas to flow at a relatively high speed to keep the valve open. This balance weight balances the ball 22 on the vertical valve, or in other words when this weight is disposed on the long end of the balance arm it balances against the ball so it does not require much gas flow to keep the valve open.

When the balance weight is disposed nearer to the short end of the balance arm, it will require a greater flow to keep the valve open and thus it will be obvious that this weight can be set to automatically close at different rates of flow. When the gas gets so low that it flutters or "floats" in the stove or in the gas line, it becomes dangerous by going out. Before the member 42 is operated to start the gas controlling mechanism to operating, all the stops in the gas lines leading to the gas lights, stoves, etc., should be closed. The diaphragm 35, which is preferably or flexible material, will be attached to the floor upon which it is mounted with sufficient rigidity so as to stand the gas pressure and also to be gas-proof, thus preventing any leaking of the gas past the diaphragm. This is relatively easy, inasmuch as there is no high gas pressure on this part at any time.

This construction is to be disposed at the most convenient place where gas is used and is for use either in public or private places. The diaphragm 35 is designed to yield to the gas pressure and as it yields it presses downward on the valve 39. Of course, the machine is started by depressing the member 42, as previously explained, which will depress the arm 28 slightly. This slight depression of the arm 28 causes the lifting of the ball 22 to open and gas will start to come into the chamber 10. As the gas comes in it causes a small pressure within this chamber and on the diaphragm 35 and this presses downward on the valve until the short end of the arm with the pin 29 has opened the valve further. More gas then fills into the chamber 10 and the flow around valve 39 increases and this pressure of the fluid flowing around valve 39 causes the further depression of the valve 39 and this valve and the valve 22 remain open until the flow of gas is again reduced or gets entirely used up. Under these circumstances the valve 39 will move upward against the diaphragm. This causes the closing of the valve 22 and flow is stopped, as before stated.

While I have illustrated certain details of construction and arrangement of parts, I do not wish to be limited to this as it is obvious that many changes might be made in the details without departing from the spirit of the invention.

I claim:—

1. A flow operated automatic gas cut off including a chamber, a gas line leading into the chamber, a valve therein, an outlet opening from the chamber, a flow operated valve disposed across said opening and when shifted against the direction of flow closing said opening, a balance lever pivotally mounted within the chamber and having means at one end for shifting the first named valve from its seat, means at the other end operatively connecting this end of the lever to the second named valve, a weight shiftable along the balance lever from a point adjacent one end to a point adjacent the other, and means for manually depressing that end of the lever connected to the second named valve.

2. An automatic flow operated gas cut off including a chamber, a gas line leading into the chamber, a vertically movable valve disposed in the gas line, the chamber having an outlet opening, a flow operated valve on the outflow side of said opening and having a relatively large area adapted to close the discharge opening, an unequally balanced lever connected at its opposite ends to the respective valves, and a weight adjustably mounted on the lever, the weight acting in one position to counterbalance or partially counterbalance the weight of the first named valve and in another position acting to depress that arm of the lever which is engaged with the first named valve.

3. A flow operated automatic gas cut off including a chamber, a gas line leading into the chamber, a vertically movable valve disposed in the gas line, a flexible diaphragm extending across the bottom of the chamber and having an opening, a valve on the outlet side of said diaphragm and having a relatively large area adapted to close the opening through the diaphragm, a lever disposed in said chamber and connected at its opposite ends to the respective valves, a weight adjustably mounted on the lever and shiftable from a point adjacent one end to a point adjacent the other end, the lever being provided with graduations and the weight being adjustable along the lever, and manually operable means for depressing that end of the lever connected to the outlet valve to thereby raise the inlet valve.

4. A flow operated automatic gas cut off including a chamber, a gas line leading into the chamber and having one portion thereof carrying a transversely extending screen whereby the gas is purified of dust, a vertically movable valve in the gas line immediately above the chamber, said valve being urged toward its seat, a pipe line leading from the lower portion of the chamber, a diaphragm extending across the lower portion of the chamber and having an opening, a flow actuated valve disposed on the outlet side of said diaphragm and when raised closing said opening, said valve being relatively large, a lever pivotally mounted within the chamber and having arms of unequal length, the long arm being operatively connected to the second named valve and the short arm having means extending upward therefrom whereby the first named valve may be raised when the short arm is raised, a weight shiftable longitudinally along the lever from a point adjacent one end of the lever and beyond the fulcrum of the lever on one side to a point adjacent the other end of the lever and beyond said fulcrum, and manually operable means for initially depressing the long arm of the lever to thereby raise the first named valve and start the flow of gas.

In testimony whereof I hereunto affix my signature.

HARRY R. STAMBAUGH.